United States Patent
Lai (10) Patent No.: US 10,726,049 B2
(45) Date of Patent: Jul. 28, 2020

(54) OBTAINING BLOCKCHAIN DATA IN STAGES

(71) Applicant: Alibaba Group Holding Limited, George Town (KY)

(72) Inventor: Lukun Lai, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/785,319

(22) Filed: Feb. 7, 2020

(65) Prior Publication Data
US 2020/0175037 A1 Jun. 4, 2020

Related U.S. Application Data (63) Continuation of application No. PCT/CN2020/072013, filed on Jan. 14, 2020.

(30) Foreign Application Priority Data

Apr. 17, 2019 (CN) .......................... 2019 1 0309271

(51) Int. Cl.
*G06F 17/30* (2006.01)
*G06F 16/27* (2019.01)
*H04L 9/06* (2006.01)

(52) U.S. Cl.
CPC .......... *G06F 16/278* (2019.01); *H04L 9/0643* (2013.01); *H04L 2209/38* (2013.01)

(58) Field of Classification Search
CPC ............................. G06F 16/278; H04L 9/0643
See application file for complete search history.

(56) References Cited

U.S. PATENT DOCUMENTS 9,569,771 B2 * 2/2017 Lesavich ............. G06F 21/6245
10,496,633 B2 * 12/2019 Pattanaik .............. H04L 9/3297
(Continued)

FOREIGN PATENT DOCUMENTS

CN 106874326 6/2017
CN 109145205 1/2019
(Continued)

OTHER PUBLICATIONS

Zhou et al., CSSP: The Consortium Blockchain Model for Improving the Trustworthiness of Network Software Services, 2017 IEEE Symposium on Parallel and Distributed Processing with Application, p. 101-107 (Year: 2017).*
(Continued)

*Primary Examiner* — Jeff A Burke
(74) *Attorney, Agent, or Firm* — Fish & Richardson P.C.

(57) ABSTRACT

This disclosure relates to obtaining blockchain data in multiple stages. In some aspects, a first node device of a blockchain network receives a data request from a client device. A distributed database of the blockchain stores target data. The data request includes a first data position identifier that identifies a first position of a first portion of the target data. The first portion of the target data is obtained from the distributed database based on the first data position identifier. A second data position identifier for a second portion of the target data is generated based on the first portion of the target data. The second data position identifier identifies a second position of the second portion of the target data and enables the client device to continue to obtain one or more additional portions of the target data from any one of the node devices.

18 Claims, 3 Drawing Sheets

(56) References Cited

U.S. PATENT DOCUMENTS

| | | | |
|---|---|---|---|
| 2017/0109735 A1* | 4/2017 | Sheng | H04L 9/3247 |
| 2017/0213209 A1* | 7/2017 | Dillenberger | G06Q 20/3829 |
| 2017/0228371 A1 | 8/2017 | Seger, II | |
| 2018/0225448 A1* | 8/2018 | Russinovich | G06Q 20/3829 |
| 2018/0247302 A1* | 8/2018 | Armstrong | H04L 63/0471 |
| 2019/0050810 A1 | 2/2019 | Nagalla et al. | |
| 2019/0229919 A1* | 7/2019 | Gurkan | H04L 9/0869 |
| 2019/0236698 A1* | 8/2019 | Postrel | H04L 9/3239 |
| 2019/0266145 A1* | 8/2019 | Qiu | G06F 21/64 |
| 2019/0325038 A1* | 10/2019 | Finlow-Bates | H04L 9/0643 |
| 2019/0354968 A1* | 11/2019 | Sato | G06Q 20/3825 |
| 2020/0027080 A1* | 1/2020 | Holland | H04L 9/3255 |
| 2020/0027096 A1* | 1/2020 | Cooner | G06Q 20/389 |
| 2020/0042958 A1* | 2/2020 | Soundararajan | G06Q 20/06 |
| 2020/0044831 A1* | 2/2020 | Soundararajan | H04L 9/088 |
| 2020/0074458 A1* | 3/2020 | Govindarajan | G06Q 20/3829 |
| 2020/0092084 A1* | 3/2020 | Maroney | H04L 9/0643 |

FOREIGN PATENT DOCUMENTS

| | | | |
|---|---|---|---|
| CN | 109167811 | 1/2019 | |
| CN | 109461079 | 3/2019 | |
| CN | 109522330 | 3/2019 | |
| CN | 109522457 | 3/2019 | |
| CN | 110162570 | 8/2019 | |
| GB | 2018007828 | * 11/2018 | H04L 9/32 |

OTHER PUBLICATIONS

Dib et al., Consortium Blockchains: Overview, Applications and Challenges, International Journal on Advances in Telecommunications, vol. 11, No. 1 and 2, p. 51-64 (Year: 2018).*

Zhang, Jiarui, A Multi-Transaction Mode Consortium, International Journal of Performability Engineering, vol. 14, No. 4, p. 765-784 (Year: 2018).*

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/072013, dated Apr. 13, 2020, 23 pages (with partial machine translation).

* cited by examiner

OBTAINING BLOCKCHAIN DATA IN STAGES

CROSS-REFERENCE TO RELATED APPLICATIONS

This application is a continuation of PCT Application No. PCT/CN2020/072013, filed on Jan. 14, 2020, which claims priority to Chinese Patent Application No. 201910309271.8, filed on Apr. 17, 2019, and each application is hereby incorporated by reference in its entirety.

TECHNICAL FIELD

One or more embodiments of the present disclosure relate to the field of data processing technology, and in particular, to obtaining blockchain data in stages.

BACKGROUND

Blockchain technology, also known as distributed ledger technology, is an emerging technology in which several computing devices participate in "accounting" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

In view of the above, one or more embodiments of the present disclosure provides a method for obtaining blockchain data in multiple times, which is applied to a blockchain network including a plurality of node devices and a client. A distributed database of the blockchain stores target data. The method includes: receiving, by a first node device, a data request from the client, wherein the data request includes a data position identifier, and the data position identifier identifies a position of a part of the target data; obtaining the part of the target data based on the data position identifier; generating a new data position identifier based on the part of target data, as a data position identifier for the client to continue to obtain the target data from any one of the plurality of node devices; and sending the part of target data and the new data position identifier to the client.

In some embodiments, the data position identifier identifies a starting position of a part of the target data. The data request further includes a capacity of the part of the target data. Obtaining the part of the target data based on the data position identifier includes: obtaining the part of target data for the client based on the data position identifier and the capacity of the part of target data.

In some embodiments, the target data includes list-type data. The capacity of the part of target data includes a number of entries of the part of target data, or a size of space occupied by the part of target data.

In some embodiments, the data position identifier is a unique identifier generated based on a last entry of list data included in the part of target data.

In some embodiments, the list data includes a hash value of a transaction stored in the distributed database of the blockchain as a credential.

In some embodiments, the blockchain is a consortium chain, the node device is a consortium chain node device, and the client is a user client connected to the consortium chain node device.

Corresponding, the present disclosure also provides an apparatus for obtaining blockchain data in multiple times, which is applied to a blockchain network including a plurality of node devices and a client. A distributed database of the blockchain stores target data. The apparatus is applied in a node device side, and the apparatus includes: a receiving unit configured to receive a data request from the client, wherein the data request includes a data position identifier, and the data position identifier identifies a position of a part of the target data; an obtaining unit configured to obtain the part of the target data based on the data position identifier; a generating unit configured to generate a new data position identifier based on the part of target data, as a data position identifier for the client to continue to obtain the target data from any one of the plurality of node devices; and a sending unit configured to send the part of target data and the new data position identifier to the client.

In some embodiments, the data position identifier identifies a starting position of a part of the target data. The data request further includes a capacity of the part of the target data. The generating unit is further configured to: obtain the part of target data for the client based on the data position identifier and the capacity of the part of target data.

In some embodiments, the target data includes list-type data. The capacity of the part of target data includes number of entries of the part of target data, or a size of space occupied by the part of target data.

In some embodiments, the data position identifier is a unique identifier generated based on a last entry of list data included in the part of target data.

In some embodiments, the list data includes a hash value of a transaction stored in the distributed database of the blockchain as a credential.

In some embodiments, the blockchain is a consortium chain, the node device is a consortium chain node device, and the client is a user client connected to the consortium chain node device.

Correspondingly, one or more embodiments of the present disclosure also provides a computer device including: a processor, and a memory having computer programs stored thereon that are executable by the processor to execute the method for obtaining blockchain data in multiple times performed by the first node device, as described above.

Correspondingly, one or more embodiments of the present disclosure also provides a computer-readable storage medium configured with computer programs executable by a processor to cause the processor to perform the method for obtaining blockchain data in multiple times performed by the first node device, as described above.

It can be seen from the above technical solution that, in the method and the apparatus for obtaining blockchain data in multiple times, a computer device and a computer-readable storage medium provided by the present disclosure, the client can flexibly obtain part of target data from the node device of the blockchain based on its requirements or restrictions. Setting data position identifier based on the attribute of uniqueness, it is unlikely to cause duplication or omission in the obtained part of target data.

DETAILED DESCRIPTION OF THE EMBODIMENTS

Embodiments will be described in detail here, examples of which are illustrated in the accompanying drawings. When the following description refers to the accompanying drawings, the same numerals in different drawings represent the same or similar elements unless otherwise indicated. The embodiments described in the following examples of embodiments do not represent all embodiments consistent with one or more embodiments of the present disclosure. Rather, they are merely examples of apparatuses and methods consistent with some aspects of one or more embodiments of the present disclosure, as detailed in the appended claims.

It should be noted that, in some embodiments, the steps of the corresponding method are not necessarily performed in the order shown and described in the present disclosure. In some embodiments, the method can include more or fewer steps than described in the present disclosure. In addition, a single step described in the present disclosure can be divided into multiple steps for description in some embodiments. Multiple steps described in the present disclosure can be combined into a single step for some embodiments.

When a user client requests target data from a database, often due to the large data amount requested or the limited page display of the client, it may be requested the target data be obtained in multiple times, to display the target data in pages on the client. Conventional schemes for requesting data in pages usually rely strongly on the paging properties of the database, and the number of data records per page is usually fixed. If new records are generated dynamically in the database, the data requested in pages can have duplicated or missing part. Moreover, when a boundary of a paged data set corresponding to the paged data request scheme happens to be in multiple pieces of data generated at the same time in the database, the data obtained from the paged data request based on the fixed data record number pattern can miss data records. If the database is dynamic updated, multiple pieces of data at this moment are later updated into the database, and data obtained with the time-based paged data request can also miss data records.

In order to solve the problems, one or more embodiments of the present disclosure provide a method for obtaining blockchain data in multiple times, which is applied to a blockchain network including a plurality of node devices and a client. The plurality of node devices store target data to be obtained in multiple times by the client.

To provide further context for the embodiments of this disclosure, a distributed ledger system (DLS), also be referred to as a consensus network (for example, consisting of peer-to-peer nodes) and a blockchain network, allows participating entities to perform transactions and store data securely and in a tamper-proof manner. Although the term "blockchain" is often associated with the Bitcoin cryptocurrency network, the blockchain used herein generally refers to DLS without involving any special application situation. As described above, the blockchain network can be provided as a public blockchain network, a private blockchain network, or a consortium blockchain network.

In a public blockchain network, the consensus process is controlled by nodes of the consensus network. For example, hundreds, thousands, or even millions of entities can collaborate to operate the public blockchain network, and each entity operates at least one node in the public blockchain network. Therefore, a public blockchain network can be considered a public network for participating entities. In some examples, most entities (nodes) must sign each block sign each block to make the block to be valid and be added to the blockchain (a distributed ledger) of the blockchain network. An exemplary public blockchain network includes the Bitcoin network as a peer-to-peer payment network. The Bitcoin network uses a distributed ledger called a blockchain. However, as mentioned above, the term "blockchain" is often used to refer to the distributed ledger and not specifically to the Bitcoin network.

Generally, public blockchain networks support public transactions. Public transactions are shared among all nodes in the public blockchain network and stored in the global blockchain. The global blockchain is a blockchain that is replicated across all nodes. In other words, all nodes are in a fully consensus state relative to the global blockchain. In order to reach a consensus (for example, agree to add a block to the blockchain), a consensus protocol is implemented within the public blockchain network. Exemplary consensus protocols include, but are not limited to, a Proof of Work (POW) mechanism implemented in the Bitcoin network.

Generally, a private blockchain network is provided for a specific entity that centrally controls read and write permissions. This particular entity controls which nodes can participate in the blockchain network. As such, the private blockchain network is often referred to as a permission network, which restrict who is allowed to participate in the network, and their level of participation (for example, only in certain transactions). Various types of access control mechanisms can be used (for example, existing participants vote to add new entities, and regulators can control access).

Generally, a consortium blockchain network is private between participating entities. In the consortium blockchain network, the consensus process is controlled by a group of authorized nodes, and one or more nodes are operated by corresponding entities (for example, financial institutions, insurance companies). For example, a consortium of ten (10) entities (e.g., financial institutions, insurance companies) can operate a consortium blockchain network, and each entity operates at least one node in the consortium blockchain network. Therefore, the consortium blockchain network can be considered as a private network for participating entities. In some examples, each entity (node) have to sign each block to make the block to be valid and be added to the blockchain. In some examples, at least a subset of entities (nodes) (for example, at least 7 entities) have to sign each block to make the block to be valid and be added to the blockchain.

Some embodiments of this disclosure will be described in further detail herein with reference to the consortium blockchain network, which is partly public among participating entities. However, it is contemplated that the embodiments of this disclosure can be implemented in any suitable type of blockchain network.

A node (or a node device) described in one or more embodiments of this disclosure refers to a node that can join the blockchain by following a corresponding node protocol and running a node protocol program for installation. Those skilled in the art usually refer to a node device that has a full backup of the blockchain distributed database as a full node, and refer to a node device that has a partial backup of the blockchain distributed database (such as data with only a block header) as light nodes. In one or more embodiments of the present disclosure, the node type of the node device is not limited.

The blockchain network can also include a client. The user entity joins the blockchain network by running a client installation program on the terminal. The client installation program can be an installation program of a blockchain node device. Accordingly, the client also serves as a node device of the blockchain, initiates a data obtaining request to its neighboring nodes when backing up the distributed database of the blockchain to obtain a copy thereof. The client installation program can also be a program on a blockchain user client with controlled access and connected to a consortium chain node device in the consortium blockchain chain. Correspondingly, since the client does not have the permission to directly access the distributed database of the blockchain, the client may not be used as a node of the blockchain, and the client can send to one or more connected consortium chain node devices a request for data the client has permission to know. This disclosure does not limit whether the client is a node device of the blockchain. As mentioned above, whether the client is a node device of a blockchain or a user device of a member node of the consortium, the client can obtain target data stored in the distributed database of the blockchain from one or more node devices in the blockchain.

The above one or more embodiments do not limit the specific position of the target data in the distributed database of the blockchain, and the target data can be stored as a content record of the transaction in the block of the blockchain, and can also be stored in the "state database" of the blockchain as state data, etc.

A transaction described in one or more embodiments in this disclosure refers to a piece of data created by a node device of a blockchain and can be finally released to a block of the blockchain. The transactions in the blockchain are classified into transactions in a narrow sense and transactions in a broad sense. A transaction in a narrow sense refers to a value transfer released by a user to the blockchain. For example, in a traditional Bitcoin blockchain network, a transaction can be a transfer initiated by a user in the blockchain. A transaction in a broad sense refers to a piece of service data with service intent released by a user entity to the blockchain through a node. As described in some embodiments, a transaction includes target data.

In addition to being stored in blocks in the form of transactions, some data in the blockchain distributed database can also be stored in the "state database" of the blockchain, such as three Merkle Patricia Tries maintained locally by node devices, including a state tree, a transaction tree, and a receipt tree, and so on.

Figure 1:
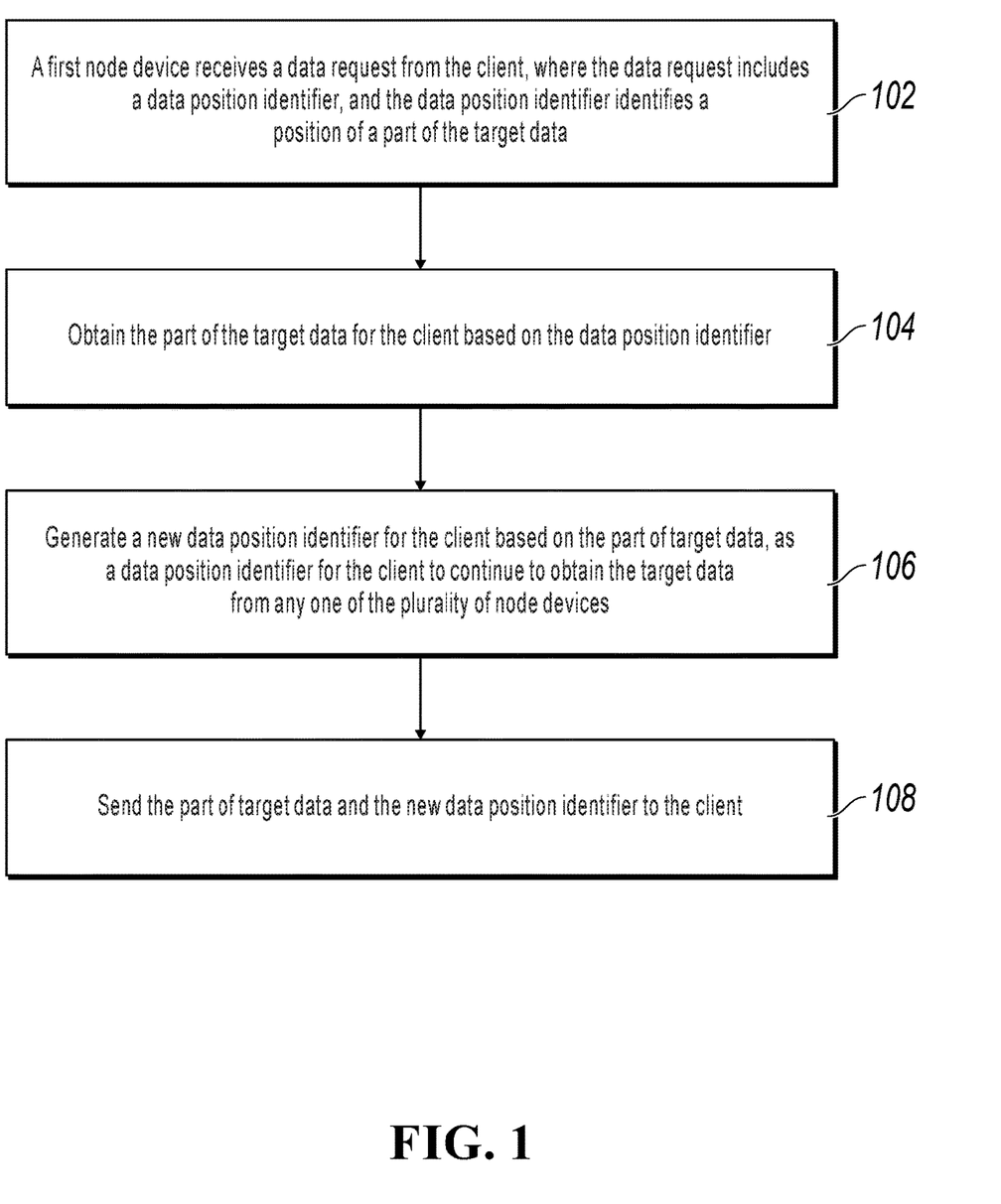
FIG. 1 is a schematic flowchart illustrating a method for obtaining blockchain data in multiple times according to an embodiment of this disclosure.

As shown in FIG. 1, the method for obtaining blockchain data in multiple times according to some embodiments include the following steps.

At step 102, a first node device receives a data request from the client, where the data request includes a data position identifier, and the data position identifier identifies a position of a part of the target data.

The first node device described in some embodiments can be any one of a plurality of node devices included in the blockchain network. The data position identifier described in some embodiments is used as a unique expression for identifying the position of a part of target data to be obtained for the current time in the target data, so that the node device of the blockchain can uniquely and accurately address to the part of the target data to be obtained for the current time in the blockchain distributed database. The expression form of the data position identifier can be set according to the attribute of the target data or the service scenario to which the target data belongs, for example, to identify the start position, the end position, or other position of the target data in the target data.

At step 104, the part of the target data is obtained for the client based on the data position identifier.

The node device of the blockchain can retrieve the corresponding part of the target data in the distributed database of the blockchain based on the data position identifier, a capacity of a part of target data which is prescribed (preset) by a system protocol, or other parameter (such as time parameter, data attribute parameter, etc.) regarding the part of target data, or factors such as data capacitor limit that can be received by the client.

In some embodiments, the data position identifier identifies a starting position of a part of the target data. Accordingly, the data request can further include a capacity of the part of the target data. Then, obtaining the part of the target data based on the data position identifier includes: based on the data position identifier and the capacity of the part of the target data, starting from a position where the data position identifier identifies (including or excluding data at the position where the data position identifier identifies), obtaining the part of target data of the capacity for the client.

The capacity of the part of the target data can include a size of space occupied by the part of target data, such as 1M, 2M, etc. When the target data is list data, it can also include a number of entries of the part of target data, such as 1-10 items, 11-15 items, etc. It can be seen that, compared with the paged data obtaining scheme in the traditional database, in the method for obtaining data in multiple times, the amount of target data obtained each time can be set flexibly based on service requirements.

At step 106, a new data position identifier is generated for the client based on the part of target data, as a data position identifier for the client to continue to obtain the target data from any one of the plurality of node devices.

After the first node device obtains the requested part of the target data, the first node device should update the data position identifier for the client, to be used by the client to continue to obtain the target data from any one of the plurality of node devices.

Below, a service scenario is taken as an example to briefly describe the method for generating the data position identifier. A user community built on a blockchain can usually carry multiple service models, such as renting a house, renting a car, making friends, etc. The resulting user service credits can be used as a token to reward users for participating in the community service. In some embodiments, the client can be used as a server-side or user-side device connected to a node device of a consortium chain of a consortium blockchain to participate in service activities built on the consortium chain. Due to the large number of users, when the client obtains the list of user credits from the node devices, the client can obtain the data in multiple times to display the data on the client in pages.

The user credit record included in the user credit list can usually include the following parameters: a user ID, a credit value (or a credit change value), a credit issuing time, a transaction hash value of a user behavior related to credit change which is stored on the blockchain as a credential, and so on. Due to the one-way uniqueness of the hash algorithm, the transaction hash value of a user behavior related to credit change which is stored on the blockchain as a credential can be a unique identifier in the distributed database of the blockchain. Any character string (or the hash value per se) connected by the hash value can be used as a data position identifier used to mark the position of the user credit record, as applied in the above embodiments.

After the node device obtains a part of user credit records to be obtained for the current time for the client, the node device can generate the following character string from the last record in the part of user credit records to be obtained for the current time: "User ID+'^'+credit value (or a credit change value) '^'+credit issuing time '^'+hash value of a user behavior related to credit change which is stored on the blockchain as a credential" as a new data position identifier, which can be taken as the data position identifier for the client to continue to obtain user credit records from any one of the plurality of node devices. Those skilled in the art can know that the data position identifier can be generated based on the attributes of the last user credit record of the part of data that has been obtained, or can be generated based on the attributes of the next user credit record of the part of data that has been obtained, or can be generated based on the attributes of any one user credit record preset under the system protocol, which is not limited herein.

At step 108, the part of target data and the new data position identifier are sent to the client.

Based on the method for obtaining blockchain data in multiple times according to one or more embodiments described above, the client can flexibly obtain part of target data from the node device of the blockchain based on its requirements or restrictions. Setting data position identifier based on the attribute of uniqueness, it may not cause duplication or omission in the obtained part of target data. Moreover, for the client that might request data copy from a plurality of nodes, due to the attribute of uniqueness of the data position identifier in the distributed database of the blockchain, no matter how many node devices the client initiates a data request to with respect to the copy of the target data, based on the consensus mechanism of the blockchain, the target data can be obtained accurately. Compared to the method for obtaining data in multiple times for a traditional database, the hit probability of the target data to be obtained can be obtained.

Figure 3:
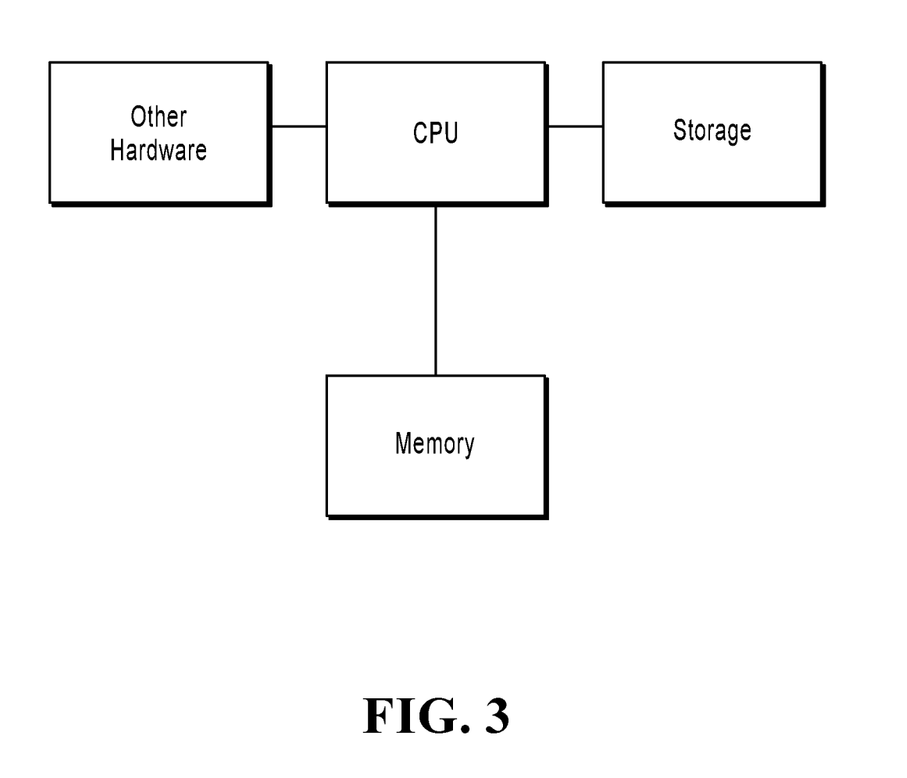
FIG. 3 is a hardware structural diagram illustrating an example of an apparatus for obtaining blockchain data in multiple times according to an embodiment of this disclosure.

Corresponding to the embodiments of the above process, the embodiments of the present disclosure further provides an apparatus 20 for obtaining blockchain data in multiple times. The apparatus 20 can be implemented by software, or can be implemented by hardware or a combination of software and hardware. Taking software implementation as an example, as a device in a logical sense, it is formed by reading corresponding computer program instructions into a memory through a CPU (Central Process Unit) of a device where it is located. From the hardware level, in addition to the CPU, the memory and the storage as shown in FIG. 3, the device in which the apparatus is located may generally include other hardware such as chips for wireless signal transmission and reception, and/or other hardware such as boards and cards for implementing network communication functions.

Figure 2:
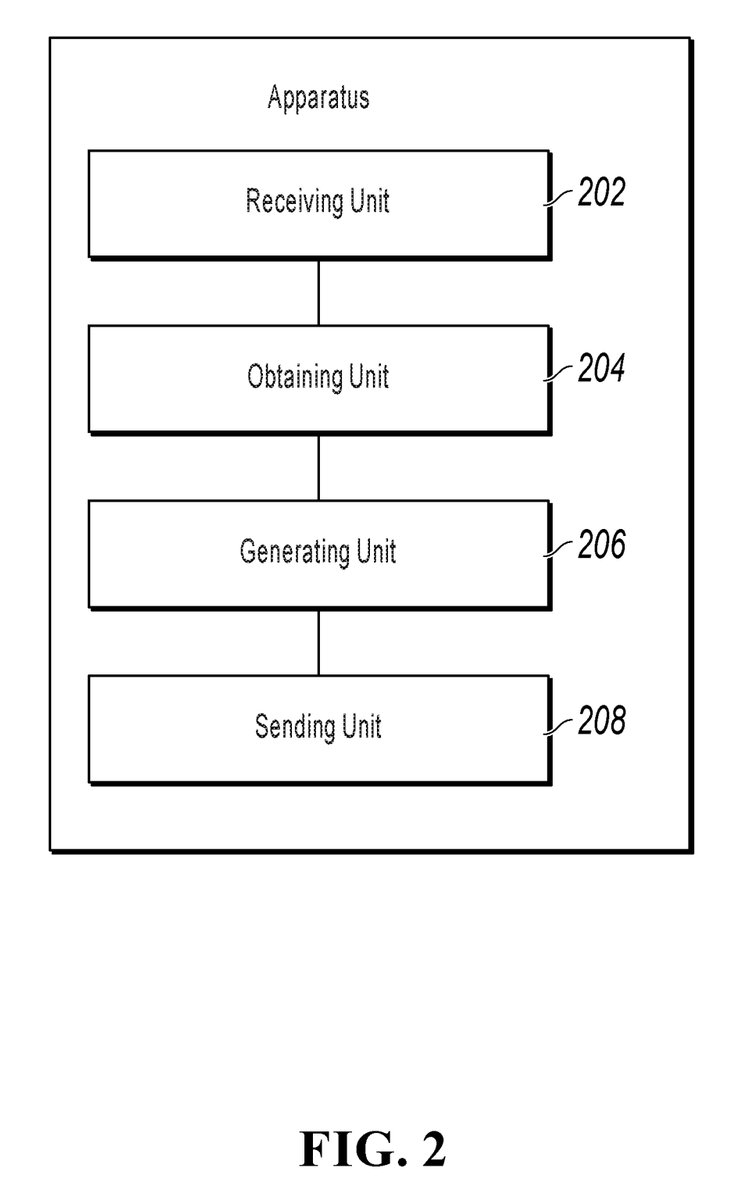
FIG. 2 is a schematic diagram illustrating an apparatus for obtaining blockchain data in multiple times, applied to a node device side according to an embodiment of this disclosure.

As shown in FIG. 2, this disclosure also provides an apparatus 20 for obtaining blockchain data in multiple times, which is applied to a blockchain network including a plurality of node devices and a client. The distributed database of the blockchain stores target data. The apparatus is applied to a node device side, and the apparatus 20 includes: a receiving unit 202 configured to receive a data request from the client, where the data request includes a data position identifier, and the data position identifier identifies a position of a part of the target data; an obtaining unit 204 configured to obtain the part of the target data based on the data position identifier; a generating unit 206 configured to generate a new data position identifier based on the part of target data, as a data position identifier for the client to continue to obtain the target data from any one of the plurality of node devices; and a sending unit 208 configured to send the part of target data and the new data position identifier to the client.

In some embodiments, the data position identifier identifies a starting position of a part of the target data. The data request further includes a capacity of the part of the target data.

The generating unit 206 is further configured to: obtain the part of target data for the client based on the data position identifier and the capacity of the part of target data.

In some embodiments, the target data includes list-type data. The capacity of the part of target data includes a number of entries of the part of target data, or a size of space occupied by the part of target data.

In some embodiments, the data position identifier is a unique identifier generated based on a last entry of list data included in the part of target data.

In some embodiments, the list data includes a hash value of a transaction stored in the distributed database of the blockchain as a credential.

In some embodiments, the blockchain is a consortium chain, the node device is a consortium chain node device, and the client is a user client connected to the consortium chain node device.

For details about the implementation process of functions and effects of units in the apparatus 20, reference can be made to the implementation process of corresponding steps in the method for obtaining blockchain data in multiple times, which are executed by the first node device. For the related parts, reference can be made to the description of the method examples, which will not be described herein again.

The apparatus examples described above are merely illustrative, wherein the units described as separate components can or cannot be physically separated, and the components displayed as units can or cannot be physical units, i.e., can be located in one place or can be distributed to multiple network modules. Some or all of the units or modules can be selected according to actual needs to achieve the objectives of solutions in the present disclosure. Those of ordinary skill in the art can understand and implement the present disclosure without any creative effort.

The apparatus, unit, or module illustrated in the above examples can be implemented specifically by using a computer chip or an entity, or by using a product having a certain function. An implementation device can be a computer, and the form of the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

Corresponding to the method examples, the examples of the present disclosure also provides a computer device. As shown in FIG. 3, the computer device includes a memory and a processor. A computer program executable by the processor is stored on the memory, and the processor, when executing the stored computer program, implements the steps of the method for obtaining blockchain data in multiple times performed by the first node device in the examples of the present disclosure. For detailed description about each step of the method for obtaining blockchain data in multiple times performed by the first node device, reference can be made to the previous contents, which will not be repeated.

Corresponding to the method examples, the examples of the present disclosure also provides a computer readable storage medium having a computer program stored thereon. The computer program is executed by a processor to implement the steps of the method for obtaining blockchain data in multiple times performed by the first node device in the examples of the present disclosure. For detailed description about each step of the method for obtaining blockchain data in multiple times performed by the first node device, reference can be made to the previous contents, which will not be repeated.

The above are the examples of the present disclosure, which are not intended to limit the disclosure. Any modification, equivalent substitution, or improvement made within the spirit and principle of the present disclosure shall be included within the protection scope of the disclosure.

In a configuration, a computing device includes one or more processors (CPUs), input/output interfaces, network interfaces, and memories.

The memories can include a non-permanent memory in a computer readable medium, a random access memory (RAM), and/or a non-volatile memory, and memories in other forms such as a read only memory (ROM) or a flash memory (flash RAM). Memory is an example of the computer readable medium.

The computer readable medium includes permanent and non-persistent, removable and non-removable media that can accomplish information storage by any method or technology. Information can be computer readable instructions, data structures, modules of a program, or other data. Examples of the computer storage medium include, but are not limited to, a phase change memory (PRAM), a static random access memory (SRAM), a dynamic random access memory (DRAM), other types of random access memory (RAM), a read only memory (ROM), an electrically erasable programmable read only memory (EEPROM), a flash memory or other memory technologies, a compact disc read only memory (CD-ROM), a digital versatile disc (DVD) or other optical storage, a cartridge magnetic tape, a magnetic tape or disk storage or other magnetic storage devices or any other non-transmission media that can be used to store information accessible by a computing device. As defined herein, the computer readable medium does not include transitory computer readable media (transitory media) such as modulated data signals and carriers.

It should also be noted that the terms "including", "comprising" or any other variants thereof are intended to cover non-exclusive inclusion, so that a process, method, product, or device that includes a series of elements includes not only those elements, but also other elements not explicitly listed, or those that are inherent to such process, method, product, or device. Without more restrictions, elements defined by the sentence "including a . . . " do not exclude the existence of other identical elements in the process, method, product or device including the elements.

Those skilled in the art should understand that the examples of the present disclosure can be implemented as a method, a system, or a computer program product. Therefore, the examples of the present disclosure can take the form of an entirely hardware example, an entirely software example, or a software and hardware combined example. Moreover, the examples of the present disclosure can take the form of a computer program product implemented on one or more computer usable storage media (including but not limited to a magnetic disk storage, a CD-ROM, an optical storage, etc.) including computer usable program codes.

The invention claimed is:

1. A computer-implemented method for obtaining blockchain data of a blockchain in multiple stages, the method comprising:
    receiving, by a first node device of a blockchain network comprising a plurality of node devices and a client device, a data request from the client device, wherein:
        a distributed database of the blockchain stores target data; and
        the data request comprises a first data position identifier that identifies a first position, within the distributed database, of a first portion of the target data;
    obtaining the first portion of the target data from the distributed database based on the first data position identifier;
    generating a second data position identifier for a second portion of the target data based on the first portion of the target data, wherein the second data position identifier identifies a second position, within the distributed database, of the second portion of the target data and enables the client device to continue to obtain one or more additional portions of the target data including the second portion of the target data from any one of the plurality of node devices; and
    sending the first portion of the target data and the second data position identifier to the client device.

2. The computer-implemented method of claim 1, wherein:
    the first data position identifier identifies a starting position of the first portion of the target data, wherein the data request further comprises a capacity of the first portion of the target data; and
    obtaining the first portion of the target data based on the first data position identifier comprises:
        obtaining the first portion of the target data based on the first data position identifier and the capacity of the first portion of the target data.

3. The computer-implemented method of claim 2, wherein:
    the target data comprises list data in a list of data; and
    the capacity of the first portion of the target data comprises (i) a number of entries in the list that is included in the first portion of the target data (ii) or a size of space occupied by the first portion of the target data.

4. The computer-implemented method of claim 3, wherein the first data position identifier is a unique identifier generated based on a last entry of the list data included in the first portion of the target data.

5. The computer-implemented method of claim 3, wherein the list data comprises a hash value of a transaction stored in the distributed database of the blockchain as ledger data.

6. The computer-implemented method of claim 1, wherein the blockchain is a consortium chain, the first node device is a consortium chain node device, and the client device comprises a user client connected to the consortium chain node device.

7. A non-transitory, computer-readable medium storing one or more instructions executable by a computer system to perform operations comprising:
    receiving, by a first node device of a blockchain network comprising a plurality of node devices and a client device, a data request from the client device, wherein:

a distributed database of a blockchain of the blockchain network stores target data; and the data request comprises a first data position identifier that identifies a first position, within the distributed database, of a first portion of the target data;

obtaining the first portion of the target data from the distributed database based on the first data position identifier;

generating a second data position identifier for a second portion of the target data based on the first portion of the target data, wherein the second data position identifier identifies a second position, within the distributed database, of the second portion of the target data and enables the client device to continue to obtain one or more additional portions of the target data including the second portion of the target data from any one of the plurality of node devices; and sending the first portion of the target data and the second data position identifier to the client device.

8. The non-transitory, computer-readable medium of claim 7, wherein:

the first data position identifier identifies a starting position of the first portion of the target data, wherein the data request further comprises a capacity of the first portion of the target data; and obtaining the first portion of the target data based on the first data position identifier comprises:

obtaining the first portion of the target data based on the first data position identifier and the capacity of the first portion of the target data.

9. The non-transitory, computer-readable medium of claim 8, wherein:

the target data comprises list data in a list of data; and the capacity of the first portion of the target data comprises (i) a number of entries in the list that is included in the first portion of the target data (ii) or a size of space occupied by the first portion of the target data.

10. The non-transitory, computer-readable medium of claim 9, wherein the first data position identifier is a unique identifier generated based on a last entry of the list data included in the first portion of the target data.

11. The non-transitory, computer-readable medium of claim 9, wherein the list data comprises a hash value of a transaction stored in the distributed database of the blockchain as ledger data.

12. The non-transitory, computer-readable medium of claim 7, wherein the blockchain is a consortium chain, the first node device is a consortium chain node device, and the client device comprises a user client connected to the consortium chain node device.

13. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

receiving, by a first node device of a blockchain network comprising a plurality of node devices and a client device, a data request from the client device, wherein:

a distributed database of a blockchain of the blockchain network stores target data; and the data request comprises a first data position identifier that identifies a first position, within the distributed database, of a first portion of the target data;

obtaining the first portion of the target data from the distributed database based on the first data position identifier;

generating a second data position identifier for a second portion of the target data based on the first portion of the target data, wherein the second data position identifier identifies a second position, within the distributed database, of the second portion of the target data and enables the client device to continue to obtain one or more additional portions of the target data including the second portion of the target data from any one of the plurality of node devices; and sending the first portion of the target data and the second data position identifier to the client device.

14. The computer-implemented system of claim 13, wherein:

the first data position identifier identifies a starting position of the first portion of the target data, wherein the data request further comprises a capacity of the first portion of the target data; and obtaining the first portion of the target data based on the first data position identifier comprises:

obtaining the first portion of the target data based on the first data position identifier and the capacity of the first portion of the target data.

15. The computer-implemented system of claim 14, wherein:

the target data comprises list data in a list of data; and the capacity of the first portion of the target data comprises (i) a number of entries in the list that is included in the first portion of the target data (ii) or a size of space occupied by the first portion of the target data.

16. The computer-implemented system of claim 15, wherein the first data position identifier is a unique identifier generated based on a last entry of the list data included in the first portion of the target data.

17. The computer-implemented system of claim 15, wherein the list data comprises a hash value of a transaction stored in the distributed database of the blockchain as ledger data.

18. The non-transitory, computer-readable medium of claim 13, wherein the blockchain is a consortium chain, the first node device is a consortium chain node device, and the client device comprises a user client connected to the consortium chain node device.

\* \* \* \* \*

UNITED STATES PATENT AND TRADEMARK OFFICE
CERTIFICATE OF CORRECTION

PATENT NO. : 10,726,049 B2
APPLICATION NO. : 16/785319
DATED : July 28, 2020
INVENTOR(S) : Lukun Lai It is certified that error appears in the above-identified patent and that said Letters Patent is hereby corrected as shown below:

In the Claims

Claim 18, Column 12, Line 51, replace "non-transitory, computer-readable medium" with -- computer-implemented system --, therefor.

Signed and Sealed this
Fourteenth Day of June, 2022

Katherine Kelly Vidal
Director of the United States Patent and Trademark Office